INVENTOR.
WILLIAM F. REHMKE
ATTORNEYS

June 3, 1969     W. F. REHMKE     3,447,292
ASPARAGUS HARVESTING MACHINE AND METHOD
Filed Feb. 18, 1966     Sheet 4 of 5

INVENTOR.
WILLIAM F. REHMKE
BY
*Hayfeal, Cole & Barnard*
ATTORNEYS

United States Patent Office 3,447,292
Patented June 3, 1969

3,447,292
ASPARAGUS HARVESTING MACHINE AND METHOD
William F. Rehmke, Seattle, Wash., assignor to Pacific Products, Inc., Seattle, Wash., a corporation of Washington
Filed Feb. 18, 1966, Ser. No. 528,511
Int. Cl. A01d 45/00
U.S. Cl. 56—327                                22 Claims

ABSTRACT OF THE DISCLOSURE

A machine for harvesting asparagus in which stalks of a predetermined height are pinched between parallel upwardly moving belts with their presence being detected by a sensing finger which in turn causes actuation of a cutter that is manipulated downwardly and in the direction of travel of the vehicle to sever the stalk at ground level. The cutting edge of the cutter is carried substantially vertically to the rear and to the side of the stalk to be cut. The edge is also generally below the top of the stalk to be cut. The edge is then positioned horizontally directly behind the stalk to be cut and is maintained in this position for a brief time while it is drawn through the stalk by the motion of the vehicle. A rotary solenoid causes both rotary and arcuate downward movement of the cutting edge from its non-cutting position. The disclosure also includes a method wherein the presence of a stalk of a predetermined size is detected and in response to such detection a cutter is moved from a particular non-cutting position to a position directly behind the stalk to be cut thereafter being moved through the stalk and then returned to its non-cutting position.

---

This invention relates generally to harvesting equipments, and methods of use thereof, for asparagus and like vegetable stalks or sprouts. More particularly, the present invention pertains to a method of and apparatus for harvesting asparagus and the like, wherein only stalks of sufficient size to be harvested are selected and cut from a growing row of random size stalks, such selection being by engagement and grasping of stalks of adequate size between pinch means, with the presence of a given stalk at the entrance point of the pinch means being detected by encounter of a detection means with a stalk thus grasped, such detection means initiating actuation of a downwardly and forwardly manipulated cutter unit to horizontally sever the stalk at ground level. Characteristic of the invention, such cutter unit comprises a flat knife with a forwardly directed edge, which knife is manipulated from a non-cutting position behind and slightly offset to the side of the stalk grasped by the pinch means, to a cutting position with the knife edge extending horizontally at ground level immediately behind the stalk to be cut, which cutting position is maintained for only a brief time, with the cutting being caused by progressive forward movement of the carrier vehicle. Certain features of the invention also pertain to cutting unit detail whereby a rotary actuator such as a rotary solenoid causes both rotary and arcuate downward movement of the cutting knife from its non-cutting, relatively raised position to its cutting, ground level position. Other features of the invention pertain to particular pinch means of the endless belt type and to side-by-side arrangements thereof in one or more rows across the row of stalks to be harvested, as well as certain electrical circuit details for selective cutter unit actuation and providing a predetermined, selectively variable delay in cutter deactuation.

Asparagus stalks, which are also known as spears or sprouts, grow in random height and random pattern from a root complex called a "crown." Crowns are planted in rows with a spacing wide enough between the rows to allow a vehicle to pass over each crowned row. Although a number of attempts have been made to develop commercially practical equipment for the automatic harvesting of asparagus stalks, it is still customary practice to cut asparagus stalks by hand because the stalks should be cut only after reaching a certain size (e.g. 6 to 8 inches high). If all of the stalks are cut at once, many stalks are too small to be usable. Even if harvested by equipment designed to be selective as to size, use of now available equipment has generally produced only erratic results with poor performance in terms of yield, both from the point of view of harvestable stalks not cut or only partially cut, and from the point of view of premature damage to the smaller, non-harvestable stalks.

Among prior attempts to devise automated asparagus harvesting equipment are the equipments shown in the following patents. Matteoli U.S. Patent No. 2,581,119 discloses a machine involving deflection of a movable, "finger" type detection by an unsupported asparagus stalk, with deflection releasing a tined knife which both cuts and impales the cut stalk, with considerable penetration of the knife and tines into the ground. In view of the quite limber nature of the harevstable stalk, such detection is erratic, and having a stalk impaling implement enter the ground from a moving vehicle is operationally impractical. In Marihart U.S. Patent No. 2,690,043, there is disclosed a machine for harvesting asparagus which involves a series of generally cylindrical probe elements, within which are arranged a pair of pivotally movable arms carrying both knives and fingers. This equipment, aside from being inherently quite complex, also involves substantial ground entry and inadequate differentiation between large and small stalks. Lafferty et al. 2,709,330 discloses an asparagus harvester involving sequential photoelectric cell detection of harvestable stalks, and a vertically movable, wheel supported assembly which is lowered to be ground engaging at the moment of a cut, and is provided with a spring loaded, reciprocated cutting knife. This equipment has the disadvantage of direct wheeled contact with the row of stalks, and also inadequate detection means in view of operational variations in light intensity arising from other factors than stalk height. It has a further disadvantage of simply leaving the cut stalks where cut, so that such must be gathered by hand.

Also known is the so-called Turkington asparagus harvester, as disclosed in Turkington U.S. Patent No. 2,767,544. This mechanism, upon mechanical detection of a stock of adequate size, energizes a rapidly rotated cutter arm intended not only to cut the stalk at ground level but also arcuately lift and throw the cut stalk onto a conveyor means. In practice, this type of equipment not only needs to cut a considerable swath from the row of stalks but also has proven erratic insofar as its capability of throwing cut stalks in free fall to a discharge conveyor. Kepner U.S. Patent No. 2,791,878 discloses another type of known automatic asparagus harvesting machine, wherein the stalk cutting is performed by a bandsaw arranged with a portion of its travel at ground level across the row of stalks. Such equipment has the obvious disadvantage of not being able to differentiate between large and small stalks. Chatagnier U.S. Patent No. 3,066,469 discloses an asparagus harvester of relatively recent evolution, wherein a given harvestable stalk is first engaged between the rims of a pair of flexible gripping wheels, the presence of the stock then being detected by a feeler, the movement of which causes release of a spring-loaded, rectilinearly moved knife member which acts to cut the stalk, the cut stalk thereafter being carried by the gripping wheels to a point of discharge. In addition to the gripping wheels of this mechanism being both delicate and bulky, and the cutting mechanism thereof being rather complicated, the cutting technique employed in this mechanism, during its cutting stroke, cuts rearwardly with respect to the direction of movement of the vehicle, rather than using to advantage the forward movement of the vehicle. Also, since its cutting mechanism must move the knife element rectilinearly a considerable distance, it must also rotate the knife a quarter of a turn while thus moving, the mechanism necessarily includes relatively complicated knife advancing means and rotating means.

In order to overcome the various disadvantageous features of prior equipments for the same purpose, the present invention provides greatly simplified stalk gripping elements (i.e. press belts), and also provides a unique cutter element manipulated and simplified mechanism therefor. In this latter respect, and as an important feature of the invention, the cutter knife operating mechanism is such as to generate from a simple rotary motion (such as provided by rotary solenoid means), a manner of cutter knife movement characterized by movement of a flat knife from a non-cutting position rearwardly of and slightly to the side of a given harvestable stalk selected for cutting by the pinch means, and associated detector means, into a position immediately behind the grasped stalk at ground level, and with the actual cutting movement of the knife through the stalk base being derived from forward movement of the vehicle itself.

Yet other advantages, features and characteristics of the method and mechanism of the present invention include its capability as to non-destructive selection of only the larger stalks for cutting, leaving smaller stalks for further growth, its capability in terms of achieving marked labor savings as compared with hand harvesting and marked improvements in yield as compared with other known automatic harvesting mechanisms, and its positive detection of stalks of sufficient size to be harvested and positive cutting thereof while the knife is moving forwardly with the supporting vehicle, and without impaling or otherwise damaging contact with the row of stalks.

These and other inherent advantages, features, characteristics and capabilities of the present invention will be apparent from the following detailed description of certain typical and therefore nonlimitive embodiments thereof, taken together with the accompanying drawings, wherein like letters and numerals refer to like parts, and wherein.

Referring more particularly to the specific embodiment of the invention shown at FIGS. 1–6, the vehicle generally indicated at V is ground supported with ground engaging steerable front wheels FW and driven rear wheels RW, laterally spaced to straddle a crowned row R of asparagus stalks, certain of which are indicated at A, of various heights. In general, and for purposes of the present invention, the surface of the row R is the working ground level, as indicated at G.

Figure 1:
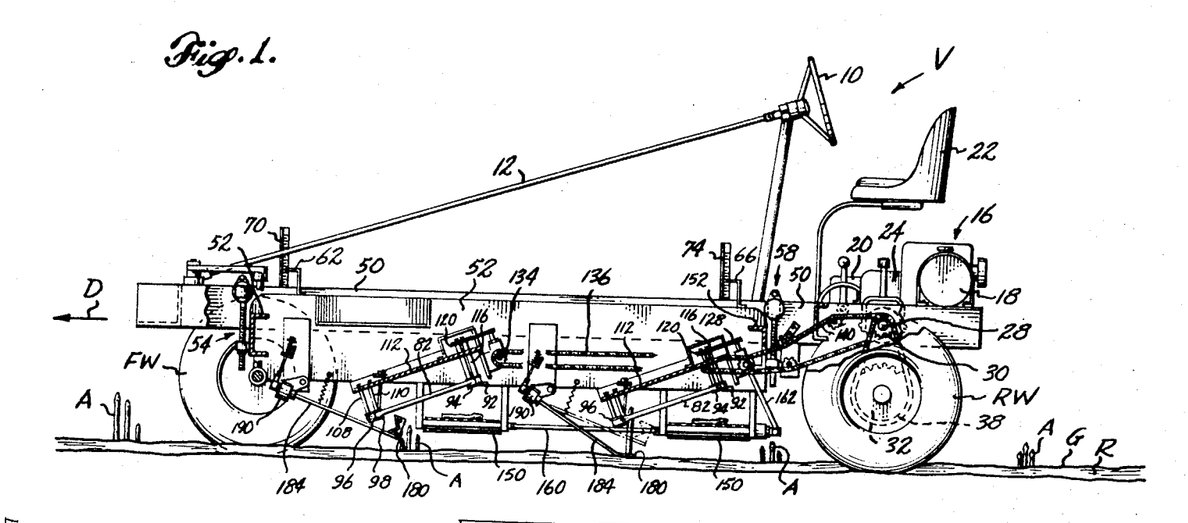
FIG. 1 is a view in side elevation, with certain parts broken away for clarity of illustration, showing a self-propelled vehicle having two banks or rows of power actuated stalk cutting and pick-up mechanisms according to the invention, with such banks of mechanisms being arranged in tandem, offset relation relative to one another.
Figure 2:
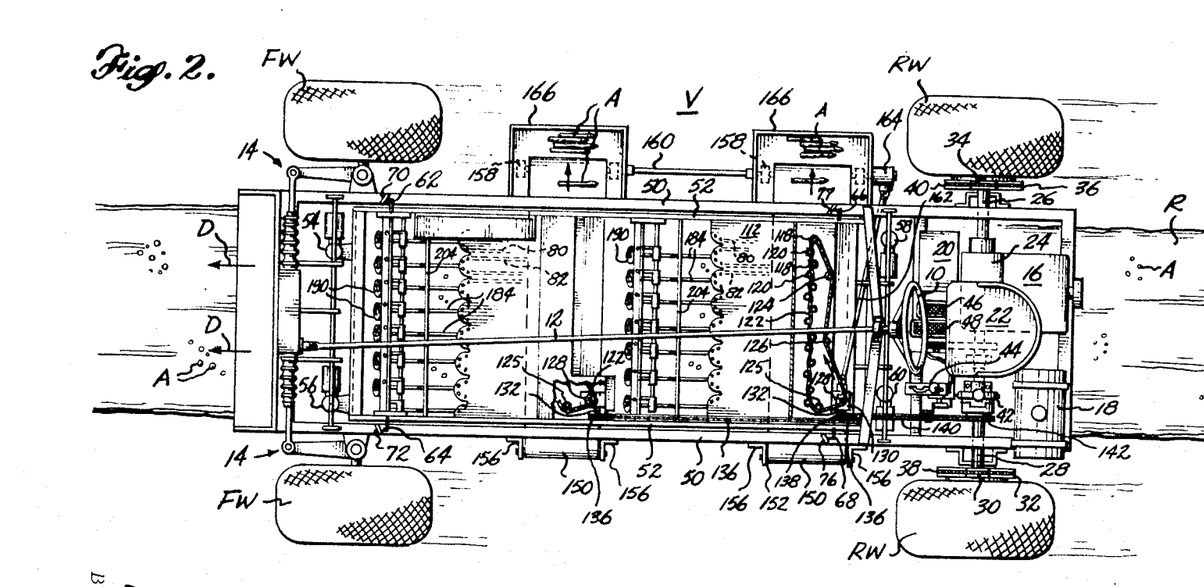
FIG. 2 is a top plan view of the equipment shown in FIG. 1.

Various elements of the vehicle V shown in FIGS. 1 and 2 simply serve steering and propulsion functions, and to provide appropriate accommodation and controls for the operator. For purposes of providing an understanding of the present invention, these elements need to be only briefly designated as follows; steering wheel 10, steering rod 12, steering linkage 14, engine 16, fuel tank 18, battery 20, seat 22, transmission 24, drive shafts 26, 28 and associated sprockets 30, 32, 34, 36 and drive chains 38, 40, clutch 42, gear shift 44, and accelerator and brake pedals 46, 48. As will be understood, operation of the equipment involves the vehicle V being propelled in a forward direction along the row R, which direction of travel is diagrammatically indicated in FIGS. 1–3 and by the arrows designated D.

The supporting frame means of the equipment shown at FIGS. 1 and 2 comprises a main frame 50 on which the wheels FW, RW are mounted, and a subframe 52 which is vertically adjustable on the main frame 50 by means of four electric motor driven screw-and-block type lift units 54, 56, 58, 60, each with an associated pointer 62, 64, 66, 68 on the subframe 52, and each cooperating with a respective scale 70, 72, 74, 76 on the main frame 50 to provide the equipment operator with a direct reading indication of the relative height of each corner of the subframe 52 with respect to the main frame 50.

In accordance with the invention, the subframe 52 carries a plurality of power actuated stalk cutting and pick-up mechanisms arranged to collectively span the row R. In the form of the invention shown in FIGS. 1 and 2, these mechanisms are arranged in two laterally extending rows or banks in tandem, with eight such mechanisms side-by-side in the first or forward row, and seven such mechanisms side-by-side in the second or rear row, simply by way of example. Each such mechanism is structurally and functionally identical to the others. As best shown in the enlarged, detail views of a single such mechanism as presented in FIGS. 3–6, each such power actuated stock cutting and pick-up mechanism includes a pair of endless pinch belts 80, 82, stretched around a respective driven sheave 84 and series of pulleys 86, 88, 90 (with respect to belt 80, noting FIGS. 4 and 6), and around a driven sheave 92 and pulleys 94, 96, 98 (with respect to belt 82, noting FIGS. 3 and 5 as well as FIGS. 1 and 2). As shown, the pulleys 86, 88, 90, 94, 96, 98 are journaled for rotation on respective mounting bolts 100, 102, 104, 106, 108, 110 depending from a sloping support plate 112 on the subframe 52, and the respective upper drive sheaves 84, 92 are keyed to respective shafts 114, 116, each in turn journalled for rotation in the support plate 112 and carrying a respective driven sprocket 118, 120. Power drive to these sprockets 118, 120 is furnished by a single drive chain 122 wove past the sprockets and past idler sprockets 124, 125, 126 and a driven sprocket 128 on a gear box 130 (FIGS. 1 and 2). The forward and rear driven sprockets 128 are in turn driven by rotation of shafts 132 which are coupled together by sprockets 134 and drive chain 136, and the rear shaft 132 mounts a second sprocket 138, driven by chain 140, which in turn is driven by sprocket 142 on engine driven drive shaft 28 (FIGS. 1 and 2) so that the various pinch belts 80, 82 are driven in the direction indicated by the arrow designation 144 (FIGS. 3–6) as the vehicle V progresses in the direction of travel indicated at D.

As will be noted in FIGS. 1–6, the pairs of endless pinch belts 80, 82 are arranged to move together in closely spaced, substantially contact relationship along their inner courses relative to one another. The narrow space provided between the respective belts 80, 82 during the course of their closely spaced upwardly sloped travel may be defined as a stalk transporting path in that in the lower portion of such path a given asparagus stalk of sufficient height to be contacted by the pair of belts is engaged and grasped by the belts at substantially the entrance point between the belts (with a selected asparagus stalk A being shown at FIGS. 5 and 6 at such entrance point). Then, after the grasped stalk is cut, the pinch belts transport the stalk therebetween (the typical position of a cut asparagus stalk during such transfer being designated in broken line in FIG. 6, at A'), until the cut stalk emerges at a discharge point adjacent the belt drive sheaves 84, 92 and is thus delivered to a subsequent transfer means such as one a pair of laterally moving, power driven conveyor belts 150, in the form of the invention in FIGS. 1–6. As best shown in FIGS. 1 and 2, such conveyor belts 150 extend around respective idler rollers 152 and driven rollers 154 journalled to rotate on respective support members 156, 158 depending from the subframe 52, and the driven rollers 154, linked together by a common drive shaft 160, are also driven from the rear shaft 132 of the pinch belt drive mechanism, through shaft 162 and gear box 164, so as to be continuously driven whenever the vehicle V moves. From the conveyors 150, the cut asparagus stalks are deposited and accumulated in removable baskets 166 hung along side main frame 50, as shown in FIG. 2.

Figure 3:
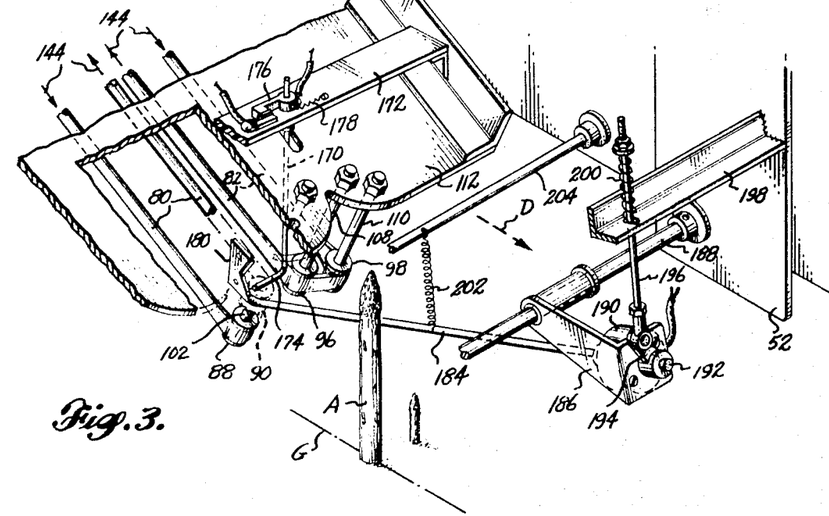
FIG. 3 is a fragmentary, isometric view, on an enlarged scale, and with various parts broken away showing one of the stalk cutting and pick-up mechanisms in the equipment shown in FIGS. 1 and 2, the operational condition shown in FIG. 3 being with the cutting knife in an inactive, non-cutting position.
Figure 4:
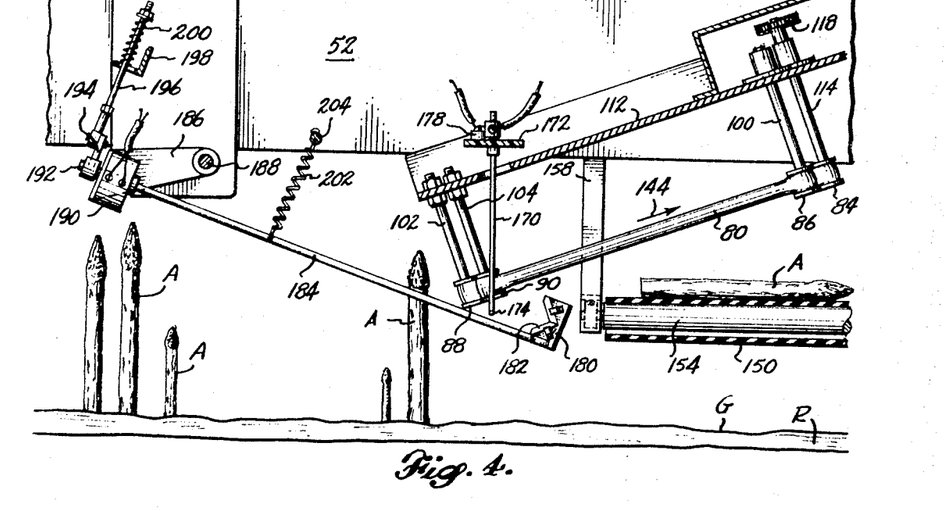
FIG. 4 is a side elevation view, with various parts broken away, of the mechanism shown at FIG. 3, in like operational condition.

Also a part of each stalk cutting and pick-up mechanism in the equipment illustrated is an asparagus stalk detector means, in the form of a depending arm or "finger" 170, journaled for pivotal movement on a common support plate 172, and having a lower, substantially horizontally extending, stalk contacting portion 174, normally disposed to span the space between the pinch belts 80, 82 just below the entrance point thereof (which normal position is shown at FIGS. 3 and 4). Fixed to the upper end of the arm or "finger" 170 is an electrical contact arm 176 which is pivotally movable with arm 170 so as to be either in normally closed engagement with a fixed electrical contact 178 on the support plate 172 when the arm lower portion 174 laterally spans the entrance point between belts 80, 82, and so as to be open with respect to such fixed contact 178 when said finger lower portion 174 is moved to a trailing position (as in FIGS. 5 and 6) upon being contacted by a given asparagus stalk A at the belt entrance point. To maintain such contacts 170, 178 normally closed, and the lower portion 174 of arm 170 normally across the stalk transporting path between the belts 80, 82, a tension spring 178 is connected between the movable contact member 176 and the support plate 172. The operation of the electrical circuit for knife actuation, as initiated by the electrical contacts 176, 178, is discussed in more detail below in connection with the electrical circuit showing presented at FIG. 9.

Figure 5:
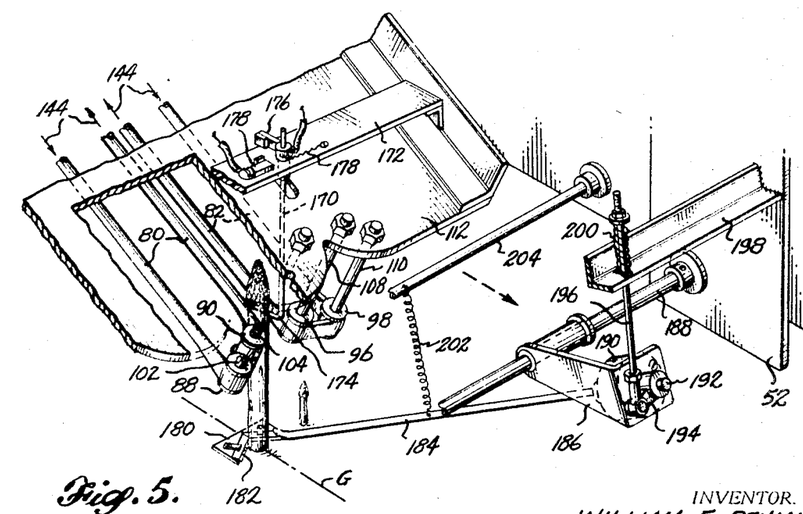
FIG. 5 is a fragmentary, isometric view of the elements shown in FIG. 3, with the cutting knife of the mechanism moved to cutting position.
Figure 6:
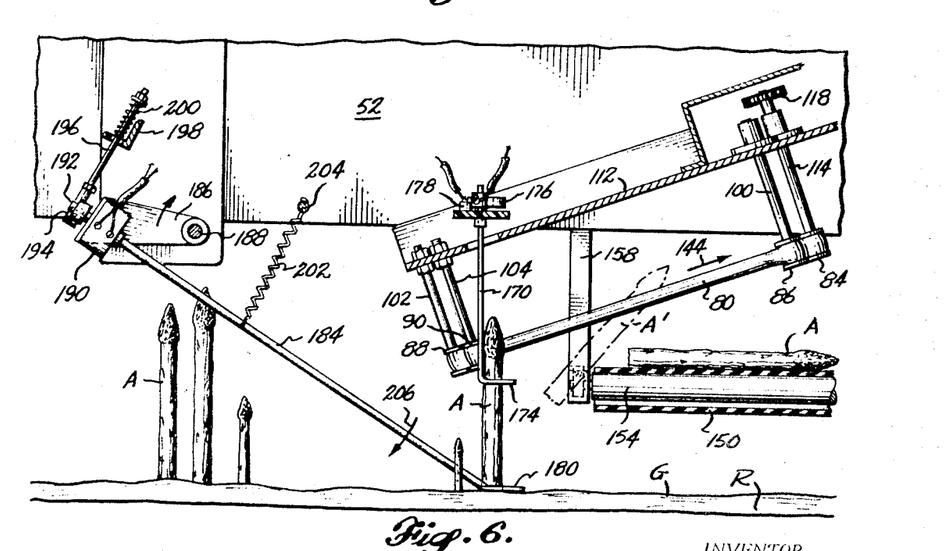
FIG. 6 is a side elevational view, with various parts broken away, of the mechanism shown at FIG. 5, in like operating condition.

In addition to the stalk grasping and detection elements above discussed, each stalk cutting and pick-up mechanism of the equipment illustrated at FIGS. 1–6 includes a unique cutter unit for selectively severing an asparagus stalk engaged and grasped by the associated pair of pinch belts. As best shown in the single unit views of FIGS. 3–6, each such cutting unit comprises a flat cutting knife 180 having a V-shaped cutting edge 182 facing forwardly with respect to the direction of travel D of the vehicle, and further comprises knife supporting and manipulating means mounted on the subframe 52, including a rotatable carrier rod 184 arranged to extend downwardly and rearwardly at a small acute angle with respect to the direction of travel of the vehicle, such knife 180 standing out laterally at the lower end of the carrier rod 184 as shown. Each cutter unit further comprises means for manipulating the rod 184 and knife 180 so that the knife 180 is oriented either in a non-cutting position (as in FIGS. 3 and 4) extending substantially vertically and substantially at about the same level as and slightly behind and to one side of the entrance point defined by the associated pinch belts 80, 82, or is oriented in a cutting position (as shown at FIGS. 5 and 6) extending substantially horizontally and at substantially the level of the ground level G, and generally vertically below the pinch belt entrance point and immediately behind a given stalk A to be cut.

To effect the manner of knife manipulation characteristic of the invention, the manipulating means for each knife carrying rod 184 comprises an offset carrier bracket 186 journaled for pivotal movement on a fixed shaft 188 mounted on and laterally spanning the subframe 52 generally forwardly of and slightly above the associated pinch belts 80, 82. Such carrier bracket 186 mounts a rotary solenoid 190 in which the carrier rod 184 is arranged axially and is rotated about a quarter-turn (i.e. about 90°) upon energization of the solenoid. As best shown in FIGS. 3 and 5, the carrier rod 184 extends substantially through the solenoid 190 and bracket 186, and mounts at its upper end 192 an offset or crank arm 194 which is in turn pivotally connected to a linkage rod 196 which near its upper end is supported by a fixed support 198 spanning the subframe 52, such connection being by means of a compression spring 200. To complete the mounting and manipulating arrangement for the knife 18 and its carrier rod 184, said rod 184 is intermediately supported in a yieldable fashion by a tension spring 202 attached at its upper end to a fixed support bar 204 on the subframe 52.

As may be visualized by comparative consideration of the relative position of the various rod and knife manipulating parts as shown in their normal, inactive position (FIGS. 3 and 4), and as shown in their active position during a cutting stroke of the knife 180 (FIGS. 5 and 6), when the solenoid 190 is energized coincident with the opening of electrical contacts 176, 178 (signifying the presence of a grasped stalk at the pinch belt entrance point), the knife 180 is manipulated from its vertically upstanding position slightly rearwardly of and slightly to one side of the grasped asparagus stalk (FIGS. 3 and 4), through about a quarter-turn rotation of the knife simultaneously with a downward arcuate movement thereof (as designated by arrow 206, FIG. 6), and to a substantially horizontal position at substantially ground level immediately behind the base of the grasped asparagus stalk, with such combined rotation and arcuate downward movement of the knife occurring simply from rotary movement of the solenoid 190, by virtue of the offset nature of the carrier bracket 186, the offset arm 194 and associated link rod 196, and the spring means 200, 202. Then, after a brief period of solenoid energization (suitably about 50 milliseconds, as discussed in connection with FIG. 9 below), when solenoid 190 is de-energized, the carrier rod 184 and its knife 180 are immediately restored to the inactive position thereof (FIGS. 3 and 4), by action of said spring means 200, 202.

Figures 7, 8:
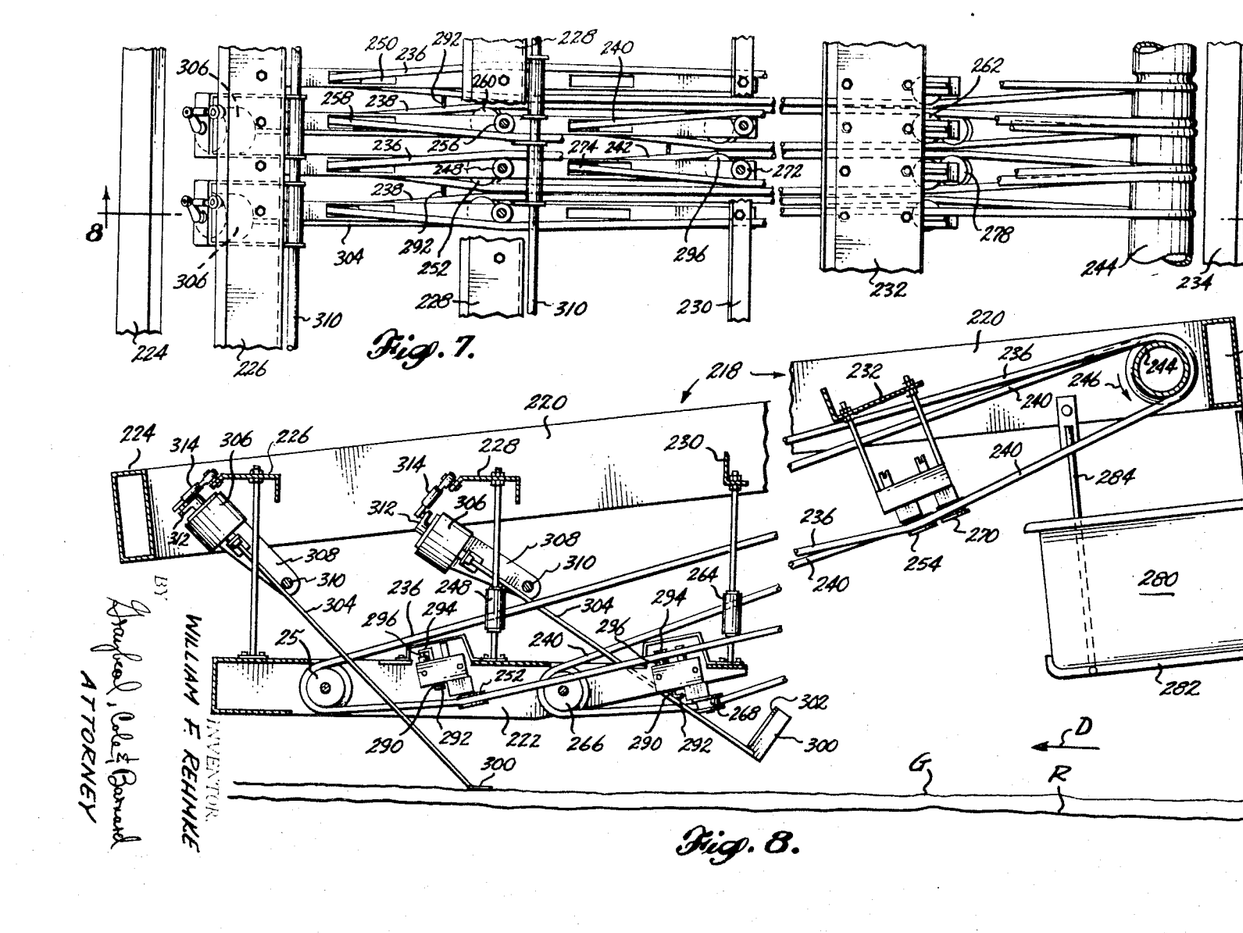
FIG. 7 is a fragmentary view on an enlarged scale showing a modified form of the invention, wherein a plurality of power actuated stock cutting and pick-up mechanisms are arranged in a single row across the row of stalks to be cut, with the various entrance points and associated cutting units of the mechanism being arranged in staggered and offset fashion.
FIG. 8 is a fragmentary view in vertical cross section, taken substantially along line 8—8 of FIG. 7 to show furhter detail of this modified form of the invention.

FIGS. 7 and 8 respectively present fragmentary plan and side elevational views of a modified form of the invention, wherein the stalk grasping and cutting mechanisms are arranged more compactly, and in a single row or bank across the row R of asparagus stalks A. As will be understood, in this form of the invention, a vehicle carried subframe, generally indicate at 218, comparable to subframe 52 of the first-discussed form of the invention, includes various longitudinally extending frame elements 220 and 222, and laterally extending frame elements 224, 226, 228, 230, 232, 234.

In the "compacted" arrangement of stalk grasping and cutting mechanisms shown at FIGS. 7 and 8, the respective pairs of relatively longer pinch belts 236, 238, and the respective pairs of relatively shorter pinch belts 240, 242 (which are in this form of the invention of solid, circular cross section) all pass around and are all driven by a multiple-sheave dried shaft 244, driven in the direction indicated at 246. As will be understood, said drive shaft 244 is suitably connected to and driven by means conventional per se, such as by direct drive from the wheel shaft of the supporting vehicle. The track of each belt 236 proceeds from drive shaft 244 past a roller 248, forward pulley 250, and guide pulley 252, 254. Similarly, each belt 238 courses a guide roller 256, forward pulley 258, and guide pulleys 260, 262, as well as the drive shaft 244. Similarly also, each belt 240 courses guide rollers 264, forward pulley 266, and guide pulleys 268, 270, and each belt 242 courses guide roller 272, forward pulley 274, and guide pulleys 276, 278, as well as the drive shaft 244. With the belt orientation shown in FIGS. 7 and 8, it will be seen that each of the pairs of belts 236, 238, and 240, 242 provides an entrance area into which harvestable stalks can enter and be grasped by a given pair of belts, and that such entrance areas collectively span the row of growing stalks. Also, similarly to the first-discussed form of the invention, each such pair of pinch belts defines a stalk transporting path which slopes at a small acute angle (about 17° and about 20° as shown) from an entrance point where the belts converge during their rearward travel to a discharge point where the belts diverge during such rearward travel. In the form of the invention shown in FIGS. 7 and 8, the discharge of cut asparagus stalks from the pinch belts is into a basket type receptable 280 removably supported by a depending frame structure 282 mounted on the subframe elements 220, 234, a s by struts 284, 286.

Also in like manner as each stalk cutting the pick-up mechanism of the earlier-discussed form of the invention, the mechanisms shown at FIGS. 7 and 8 include a stalk detector means, only two of which are shown in FIG. 8 for clarity, each comprising a stalk detector arm 290 having a lower portion horizontally extending across the path of movement at each grasped stalk, which lower portions are indicated at 292 (also note FIG. 17), which feeler arms are spring loaded by means not shown) to normally extend across such path and be pivotally movable to open, through action of an upper arm 294, a normally closed switch element 296 to initiate the cutter manipulation sequence.

Also in like manner as the cutter units of the earlier-discussed embodiment of the invention, each cutter unit of the assembly shown in FIGS. 7 and 8 comprises a flat cutting blade 300 having in this instance a straight cutting edge 302), with the blade carrying rod 304 being mounted axially in a rotary solenoid 306, in turn carried by an offset bracket 308 pivotally mounted on a fixed shaft 310 supported by the subframe 218, with an offset arm 312 being mounted on the upper end of the carrier rod 304 and operating with pivotal linkage 314 interconnected between such arm 312 and the respective fix support 226, 228 to cause downward movement of the blade 300 from an inactive, non-cutting position as shown at the right in FIG. 8) to the active, cutting position (as shown at the left in FIG. 8) on the occasion of energization of the rotary solenoid 306. Since solenoids 306, as shown in FIGS. 7 and 8, are suitably of a type which are internally spring loaded to be self-restoring to their de-energized condition, the equipment arrangement shown in FIGS. 7 and 8 does not include any external return springs for the carrier rods and knives, although such could readily be provided if desired.

Figure 9:
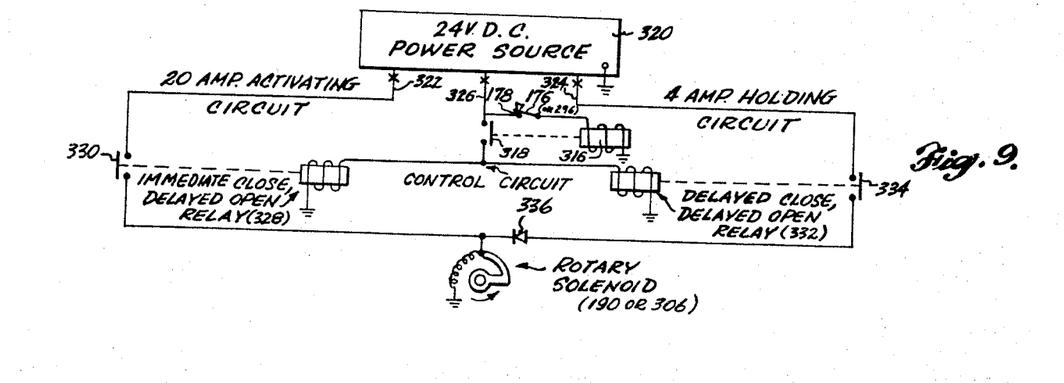
FIG. 9 is a schematic and diagrammatic view of a typical electrical control circuit means for each of the cutting units of the illustrated equipment.

FIG. 9 illustrates in schematic and diagrammatic form a typical electrical control and power circuit for operating each of the stalk cutting units of the earlier-discussed forms of the invention. Basically, the manner of operation of this circuit is that of immediately initiating energization of the rotary solenoid of the cutting unit upon detection of a cuttable asparagus stalk at the entrance point of the associated pinch belts to bring the cutting knife from non-cutting to cutting position, then maintaining such energization for a sufficient time to permit the knife to be drawn through the stalk, then promptly returning the knife to non-cutting position so the knife will cut no more than the intended stalk. Considering that the type of harvesting equipment here involved is intended to be driven at about 1–2½ miles per hour while operating in the field, and considering that with a knife about 2 inches wide it is only necessary to maintain the knife in cutting position for about 2 inches of progress along the direction of travel to accomplish a particular cut, it can be computed that after being brought to cutting position the knife should be maintained in such cutting position for about 50–100 milliseconds. Also to be considered in connection with the control and power circuit for each cutting unit is the fact that the power requirement for initiating energization and knife movement to cutting position is considerably higher than the power requirement of the rotary solenoid for simply maintaining the knife in cutting position after such position is reached. In this respect, and utilizing rotary solenoids of a commercially available type (such as Ledex Mod. S–8211–019, 95° Right Hand Drive, manufactured by Ledex, Inc. of Dayton, Ohio) for operation of the cutting units, the initial power requirement is about 20 amps. in a 24 volt DC power system, while the holding power requirement is only about 4 amps. While a high power level could be maintained at each energized solenoid for the entire energized period if desired, such manner of operation would involve a needless power drain, and render more likely a much higher peak power requirement (considering that each cutting unit is designed to operate at an independent and random repetition frequency). In general, the control and power circuit shown at FIG. 9 is compatible with these considerations as to high initial power and lesser power for the holding period, and as to the maintenance of solenoid energization for a finite time. More specifically, utilizing a 24 DC volt power source 320 capable of providing for each cutting unit a 20 amp. output 322, a 4 amp. output 324, and a lower power (e.g. 1 amp.) output 326 for control circuit energization, the control circuit connected to such output 326 includes the normally closed electrical contacts 176, 178 (in FIGS. 1–6) or switch element 296 (in FIGS. 7 and 8), which normally energizes a control relay 316 to maintain relay contact 318 normally open. When contact 176, 178 open by movement of the stalk detector element, the closure of relay contact 318 energizes a relay 328 of the immediate close, delayed open type (conventional per se), having a delayed open time of about 10 milliseconds. Upon closure of contact 330 of said relay 328, the 20 amp. power output 322 is applied directly to the rotary solenoid 190 (or 306) for about the 10 millisecond period indicated. Meanwhile, upon closure of the contacts, 176, 178 (or 296), a second relay 332 of the delayed closed, delayed open type) conventional per se) providing about a 10 millisecond delay in initial closure and about a 50 millisecond delay in opening of a contact 334. As will be apparent, closure of the relay contact 334 applies the 4 amp. power to the rotary solenoid 190 (or 306) for the desired time after initiation of control (e.g. from about 10 millisecond to about 50 seconds). With the continuing supply of holding current to the rotary solenoid, such is maintained energized even though the higher power 20 amp. activating power is removed at about the time of application of the holding current. In the circuit shown at FIG. 9, a power diode 336 is connected in series with the current flow from contact 332 in the 4 amp. holding circuit to the rotary solenoid, to isolate the 4 amp. holding circuit from the 20 amp. activating circuit in the event of some overlap in the time contacts 330 and 334 are closed. As will be apparent, there are many variations of control and power circuits to operate each of the cutting units of the harvesting equipment of the present invention, consistent with the foregoing considerations as to activating power and holding power required for the rotary solenoids, and consistent with any desired length of cut of each knife per cutter unit energization.

As an important feature of the invention, the various pairs of pinch belts 80, 82 in the form of the invention disclosed at FIGS. 1–6, and 236, 238 and 240, 242 in the form of the invention shown at FIGS. 7 and 8 are preferably driven at substantially the same lineal speed as the speed of movement of the supporting vehicle over the ground, with the result there is little or no relative horizontal movement between the belts and an asparagus stalk A during the time the stalk is being grasped at the entrance point of the belts. By this correlation of speed between the rearwardly moving belt parts and the forwardly moving supporting vehicle, the asparagus stalks A are maintained in substantially their normal attitude with respect to the ground G as they are being grasped and while being cut. It will be apparent, however, that since the grasping and cutting of a given stalk occurs almost simultaneously, there can be a substantial variation as to the relative belt speed and speed of movement of the vehicle over the ground, if desired.

Other modifications, variations and adaptation of the disclosed equipment and equipment components will readily occur to those skilled in the art to which the invention is addressed, within the scope of the following claims. Thus, simply by way of further example, the harvesting machine can readily be designed to span two or more rows of growing stalks, and can be either self-propelled as disclosed, or be designed to be towed by a tractor or the like. As will also be apparent, the cut stalks can be handled in any manner desired after discharge from the pinch belts. As a further typical variation, the stalk detector means situated at the entrance point of the belts can take any of a variety of known forms to produce the desired change in condition of the associated control circuit to initiate knife transfer from non-cutting to cutting position.

What is claimed is:

1. The method of machine harvesting of asparagus or the like, growing in a row at substantially ground level, said method comprising:
    (A) selectively grasping an asparagus stalk of sufficient height to be harvested, between laterally opposed pinch means,
    (B) detecting the presence of an asparagus stalk thus engaged and grasped,
    (C) in response to such detection, manipulating a flat knife from a non-cutting position slightly rearwardly of and slightly to one side of the grasped asparagus stalk, to a substantially horizontal position and at substantially ground level immediately behind the base of the grasped asparagus stalk, and maintaining the knife in such substantially horizontal position until the knife is moved through and serves the grasped asparagus stalk,
    (D) promptly restoring such knife to its non-cutting position after the asparagus stalk is cut, and
    (E) maintaining the cut asparagus stalk in the grasp of such pinch means for a time to deliver same to a discharge point for further transfer to cut stalk accumulator means.

2. In a harvester for asparagus or the like, for use in plurality on a ground supported vehicle movable over a row of asparagus stalks, and wherein such vehicle is equipped with a plurality of asparagus stalk cutter units, each independently operated in conjunction with an asparagus stalk detector means and an asparagus stalk handling means for engaging, grasping and transporting asparagus stalks when cut from a point of cut to cut stalk accumulating means on or associated with the vehicle, a cutter unit comprising:
    (I) a cutting knife having a cutting edge facing forwardly with respect to the direction of travel of the vehicle;
    (II) knife supporting and manipulating means mounted on said frame, including a rotatable carrier rod with said knife standing out laterally of the rod on one end thereof, and rod manipulating means for manipulating said knife to either be oriented in either a non-cutting position substantially at the same level as and slightly behind said stalk detecting means, or to be manipulated to be oriented in a stalk cutting position extending substantially horizontally from the carrier rod at substantially ground level below the entrance point between said pinch belts, said rod manipulating means including,
        (A) an offset carrier bracket pivotally mounted to said frame,
        (B) rotary transfer means carried by said carrier bracket and mounting said carrier rod for rotary movement with respect to said carrier bracket,
        (C) linkage means including an off set arm between said frame and said carrier rod causing downward angular movement of said carrier bracket, transfer means, carrier rod and knife as well as rotation of the carrier rod and knife on the occasion of actuation of said solenoid means, and
        (D) control means normally maintaining said transfer means in a condition establishing said cutting knife in its non-cutting position and causing movement thereof to establish said knife in its cutting position a brief time upon detection of a stalk to be cut.

3. A cutting unit according to claim 2, wherein said knife carrier rod is oriented at an angle of about 20° with respect to ground level when the knife is in its non-cutting position, and at an angle of about 30° with respect to ground level when the knife is in its cutting position.

4. A cutting unit according to claim 2, wherein said transfer means is a rotary solenoid, and said control means is an electrical control circuit provinding, after initial energization of said solenoid means, a circuit-generated delay of about 50–100 milliseconds before de-energization of said solenoid means.

5. A cutting unit according to claim 4, wherein said electrical control circuit provides for said solenoid means an initial, high power energization current of relatively short duration, then a final, relatively low power, holding current of longer duration and continuing until solenoid de-energization.

6. A cutting unit according to claim 2, wherein the cutting edge of said knife is of V-configuration.

7. A cutting unit according to claim 2, wherein the cutting edge of said knife is straight.

8. A harvester for asparagus or the like, comprising:
    (A) a ground supported vehicle;
    (B) frame means on said vehicle adapted to straddle and be moved along a row of upstanding asparagus stalks;
    (C) a plurality of power actuated stalk cutting and pick-up mechanisms arranged side-by-side across the row of asparagus stalks, each of such cutting and pick-up mechanisms including:
        (i) a pair of endless pinch belts arranged to move together in closely spaced, substantially contacting relationship along a stalk transporting path extending from an entrance point slightly above ground level to a discharge point well above ground level, with such stalk transporting path sloping upwardly and rearwardly of the direction of travel of said vehicle at a small acute angle;

(ii) asparagus stalk detector means situated slightly below said entrance point and arranged to contact and be deflected by any asparagus stalk encountering said entrance point and being engaged and grasped by said pinch belts yet not be deflected by any asparagus stalk of insufficient height to be engaged and grasped by said pinch belts, (iii) a cutter unit for severing an asparagus stalk engaged and grasped by said pair of pinch belts substantially at the entrance point thereof, said cutter unit comprising:

(a) a cutting knife having a cutting edge facing forwardly with respect to the direction of travel of said vehicle, (b) knife supporting and manipulating means mounted on said frame, including a rotatable carrier rod arranged to extend downwardly and rearwardly with respect to the direction of travel of said vehicle with said knife standing out laterally at the lower end of the said carrier rod, and rod manipulating means for manipulating said knife to be oriented either in a non-cutting position extending substantially vertically and substantially at about the same level as and slightly behind and to one side of the entrance point defined by the pinch belts, or be oriented in a stalk cutting position extending substantially horizontally at substantially ground level and generally vertically below the said entrance point defined by the pinch belts, said rod manipulating means including, (1) an offset carrier bracket pivotally mounted to said frame means, (2) rotary solenoid means carried by said carrier bracket and mounting said carrier rod for rotary movement with respect to said carrier bracket, (3) linkage means including an offset arm between said frame and said carrier rod causing downward angular movement of said carrier bracket, solenoid means, carrier rod and knife as well as rotation of the carrier rod and knife on the occasion of actuation of said solenoid means, (4) resilient means normally urging and maintaining said carrier bracket, solenoid means, carrier rod and knife in the position thereof which maintains said knife in its non-cutting position, and (5) electrical circuit means normally maintaining said solenoid means in a de-energized condition and causing energizing of said solenoid means for a brief time on the occasion of deflection of said stalk detector means; and (D) power drive means on said vehicle for continuously driving the pairs of pinch belts; and (E) electrical power supply means associated with said vehicle for energizing said electrical circuit means.

9. A harvester according to claim 8, wherein said frame means comprises a wheel supported main frame and a main frame supported subframe in turn carrying the plurality of power actuated stalk cutting and pickup mechanisms, and the mechanical arrangement of the subframe on the main frame includes means for vertically moving the subframe on the main frame while the harvester is in operation, to permit operational adjustment of the height of the stalk cutting and pick-up mechanisms as the vehicle moves along the row of asparagus stalks.

10. A harvester according to claim 8, wherein said plurality of power actuated stalk cutting and pick-up mechanisms includes two banks or units arranged in tandem along the path of travel of the vehicle, with units of the second bank staggered to place the paths of travel of the entrance points between the paths of travel of the entrance points of the units of the first bank.

11. A harvester according to claim 8, wherein said plurality of power actuated stalk cutting and pick-up mechanisms are arranged in a row laterally across the row of asparagus stalks, with all pairs of pinch belts driven from a common shaft, and with the various entrance points of the pinch belts being staggered alternately along the direction of travel.

12. A harvester according to claim 8, wherein said plurality of pairs of pinch belts are driven at substantially the same lineal speed as the speed of movement of the supporting vehicle over the ground, with the result there is little or no relative horizontal movement between a stalk and the belts grasping the stalk during the time the stalk is being grasped at the entrance point of the belts.

13. A harvester according to claim 8, further comprising laterally moving belt conveyor means to which cut asparagus stalks are discharged from the various pairs of pinch belts.

14. A harvester according to claim 8, wherein the stalk transporting path defined by said pinch belts is oriented at an angle of about 20° with respect to ground level, and said knife carrier rod is oriented at an angle of about 20° with respect to ground level when the knife is in its non-cutting position, and at an angle of about 30° with respect to ground level when the knife is in its cutting position.

15. A harvester according to claim 8, where said asparagus stalk detector means comprises a spring-loaded, pivotally movable stalk contacting element normally biased to lie across the path of relative movement of an asparagus stalk engaged by said pinch means, and said electrical circuit means includes a pair of electrical contacts, one of which is moved in response to pivotal movement of said stalk contacting element.

16. A harvester according to claim 8, wherein said electrical circuit means provides, after initial energization of said solenoid means, a circuit-generated delay of about 50–100 milliseconds before de-energization of said solenoid means.

17. A harvester according to claim 8, wherein said electrical circuit means provides for said solenoid means an initial, high power energization current of relatively short duration, then a final relatively low power, holding current of relatively longer duration and continuing until solenoid de-energization.

18. The method of machine harvesting of asparagus or the like, growing in a row at substantially ground level, said method comprising:

(A) moving a harvesting vehicle along a row of stalks, (B) detecting the presence of a stalk of a predetermined height, (C) in response to such detection, manipulating a cutter from a non-cutting position slightly behind and to one side of the stalk, to a substantially horizontal position and at substantially ground level immediately behind the base of the stalk, and maintaining the cutter in such substantially horizontal position until the cutter is moved through and severs the stalk, (D) promptly restoring such cutter to its non-cutting position after the stalk is cut, and (E) delivering the cut stalk to a discharge point.

19. In a harvester for asparagus or the like, for use on a ground supported vehicle movable over a row of asparagus stalks, and wherein such vehicle is equipped with an asparagus stalk cutter unit, operable in conjunction with an asparagus stalk detector means and an asparagus stalk handling means for cutting and transporting asparagus stalks from a point of cut to cut stalk accumulating means on or associated with the vehicle, the cutter unit comprising:
(I) cutting means having a cutting edge facing forwardly with respect to the direction of travel of the vehicle;
(II) supporting and manipulating means mounted on said frame for positioning said cutting means from a non-cutting position generally behind and to one side of the stalk to be cut, to a stalk cutting position extending behind the stalk and substantially horizontally at substantially ground level; and
(III) control means for said supporting and manipulating means normally maintaining said cutting means in said non-cutting position and causing movement thereof to establish said cutting means in its cutting position a brief time after detection of a stalk to be cut.

20. The harvester defined by claim 19, wherein said cutting edge is vertically disposed when in said non-cutting position.

21. The harvester defined by claim 19, wherein said cutting edge is at a level above ground that is below the highest points of the stalk to be cut when in said non-cutting position.

22. The harvester defined by claim 21, wherein said cutting edge is vertically disposed when in said non-cutting position.

References Cited

UNITED STATES PATENTS

| | | | |
|---|---|---|---|
| 2,767,544 | 10/1956 | Turkington | 56—327 |
| 2,791,878 | 5/1957 | Kepner | 56—327 |
| 3,066,469 | 12/1962 | Chatagnier | 56—327 |
| 3,176,456 | 4/1965 | Franzen | 56—327 |

RUSSELL R. KINSEY, *Primary Examiner.*